(12) United States Patent
Liu et al.

(10) Patent No.: US 8,657,542 B2
(45) Date of Patent: Feb. 25, 2014

(54) CARGO MANAGEMENT SYSTEM FOR VEHICLE

(75) Inventors: Andrew Liu, Nanjing (CN); Qiang Zhao, Nanjing (CN); Robert Ni, Nanjing (CN); Jason Xu, Nanjing (CN); Bruce Yang, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/370,349

(22) Filed: Feb. 10, 2012

(65) Prior Publication Data

US 2012/0251261 A1  Oct. 4, 2012

(30) Foreign Application Priority Data

Mar. 28, 2011 (CN) ...................... 2011 2 0085019 U

(51) Int. Cl.
*B60P 7/08* (2006.01)
*B61D 45/00* (2006.01)

(52) U.S. Cl.
USPC .......................................... 410/106; 410/104

(58) Field of Classification Search
USPC ............. 410/106, 104, 105, 150, 115, 46, 97, 410/110, 116; 296/181.3, 181.1, 184.1, 296/37.6, 39.2; 224/403
See application file for complete search history.

(56) References Cited

U.S. PATENT DOCUMENTS

| 4,256,425 | A | * | 3/1981 | Burgess et al. | ............... | 410/149 |
| 4,575,146 | A | * | 3/1986 | Markos | ........................ | 296/39.2 |
| 4,650,383 | A | * | 3/1987 | Hoff | .............................. | 410/149 |
| 4,772,165 | A | * | 9/1988 | Bartkus | ......................... | 410/139 |
| 5,560,576 | A | * | 10/1996 | Cargill | ...................... | 248/231.61 |
| 5,899,544 | A | * | 5/1999 | James et al. | .................. | 312/198 |
| 6,350,089 | B1 | | 2/2002 | Tekavec | | |
| 6,565,300 | B2 | * | 5/2003 | Herring | ......................... | 410/102 |
| 6,585,465 | B1 | | 7/2003 | Hammond et al. | | |
| 6,700,027 | B1 | | 3/2004 | Johnson et al. | | |

(Continued)

FOREIGN PATENT DOCUMENTS

| CA | 2594903 A1 | 2/2008 |
| WO | 2009132422 A1 | 11/2009 |

OTHER PUBLICATIONS http://www.northerntool.com/shop/tools/product_200325147_200325147, Northern Tool and Equipment, Buyers Aluminum Super Track Set—Model #ST93.

(Continued)

*Primary Examiner* — Glenn Dayoan
*Assistant Examiner* — Sunsurraye Westbrook
(74) *Attorney, Agent, or Firm* — Shook Hardy & Bacon LLP

(57) ABSTRACT

A cargo management system for a vehicle having a cargo area (e.g., pickup bed) may include various elements. For example, the system may include a rail attachable to the interior surface of the cargo box inner panel, at least one reinforcement plate positionable against the outer surface of the inner panel, and a plurality of fasteners for holding the rail to the inner panel backed by the reinforcement plate. The rail may have a rail portion and a body portion. The body portion is positioned through a slot formed in the bedliner and includes a base and a pair of opposed side walls connecting the base with the rail portion. Each reinforcement plate has apertures to accommodate multiple mechanical fasteners and reinforcement segments, which are attached by reinforcement segment bridges.

20 Claims, 5 Drawing Sheets

(56) References Cited

U.S. PATENT DOCUMENTS

| | | | |
|---|---|---|---|
| 7,001,122 B2 | 2/2006 | Bommarito et al. | |
| 7,052,220 B1 | 5/2006 | Jutila et al. | |
| 7,503,737 B2 | 3/2009 | Sherman | |
| 2004/0041427 A1* | 3/2004 | Vitoorapakorn et al. | 296/39.2 |
| 2007/0110539 A1 | 5/2007 | Klinkman et al. | |
| 2008/0014041 A1 | 1/2008 | Randazzo et al. | |
| 2008/0101883 A1 | 5/2008 | Derecktor | |
| 2009/0080995 A1 | 3/2009 | Peterson | |
| 2009/0274531 A1 | 11/2009 | Townson | |
| 2010/0143064 A1* | 6/2010 | Gomez | 410/110 |

OTHER PUBLICATIONS http://www.pickupspecialties.comp/Cargo_catch/track_truck_bed_tie_down_system.htm, Pickup Specialties, SR Track Truck Bed Tie Down System.

http://www.realtruck.com/dee_zee_side_wall_tie_downs/R142101P1C1T.html, RealTruck.com, Dee Zee Side Wall Tie Downs.

http://www.realtruck.com/extang_cargo_cleats/R14484P1C1T.html, RealTruck.com, Extang Cargo Cleats.

* cited by examiner

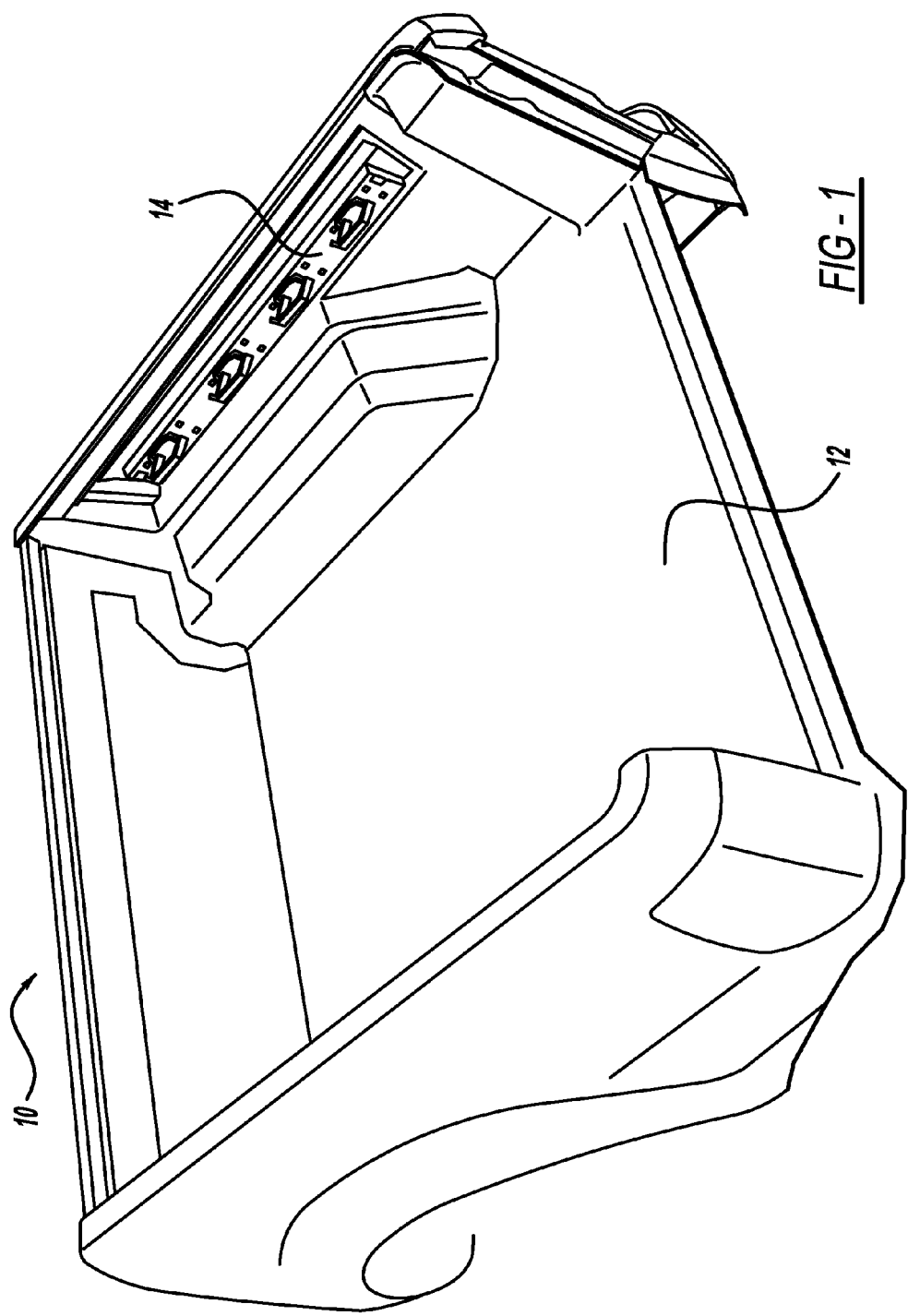

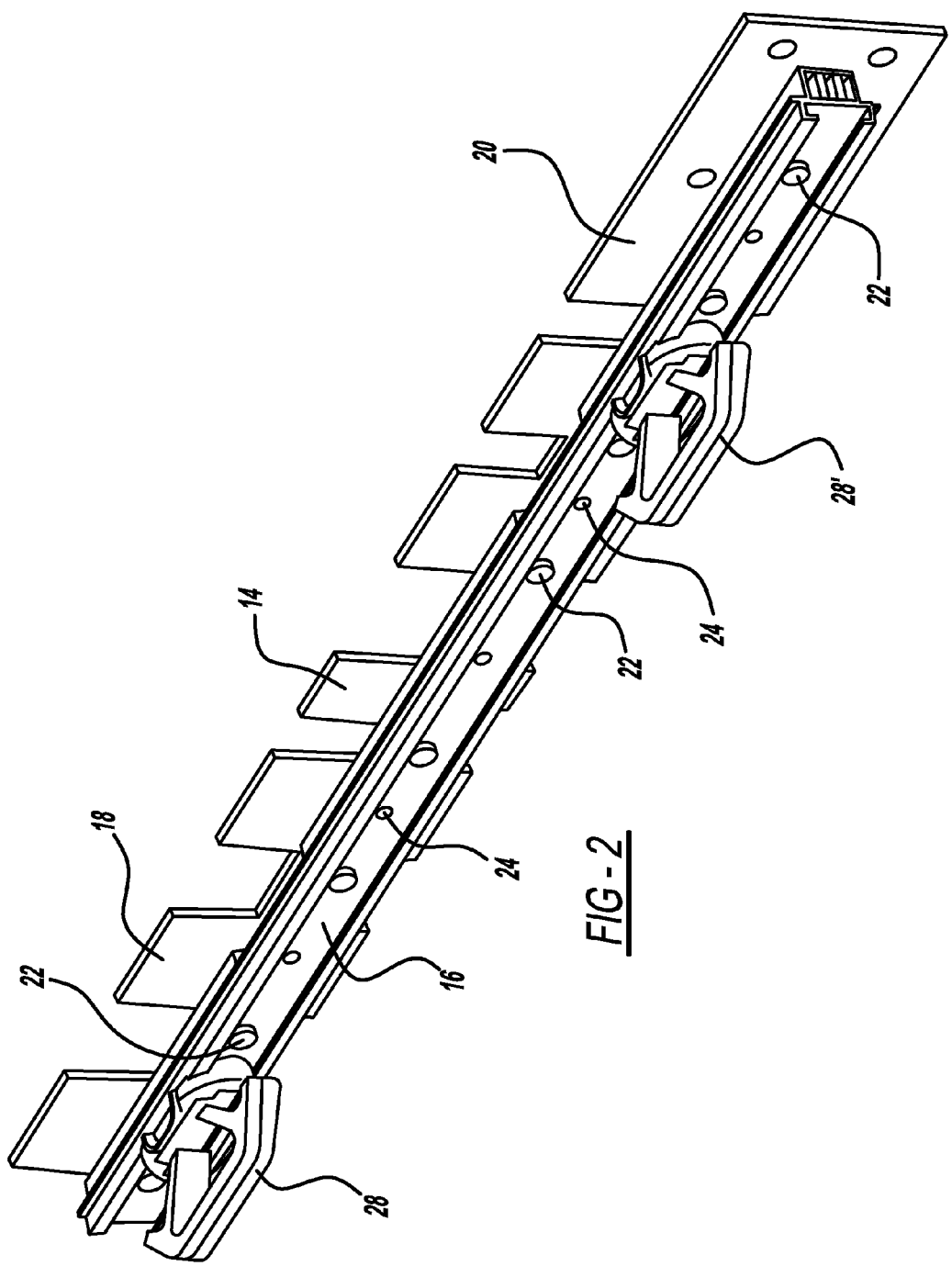

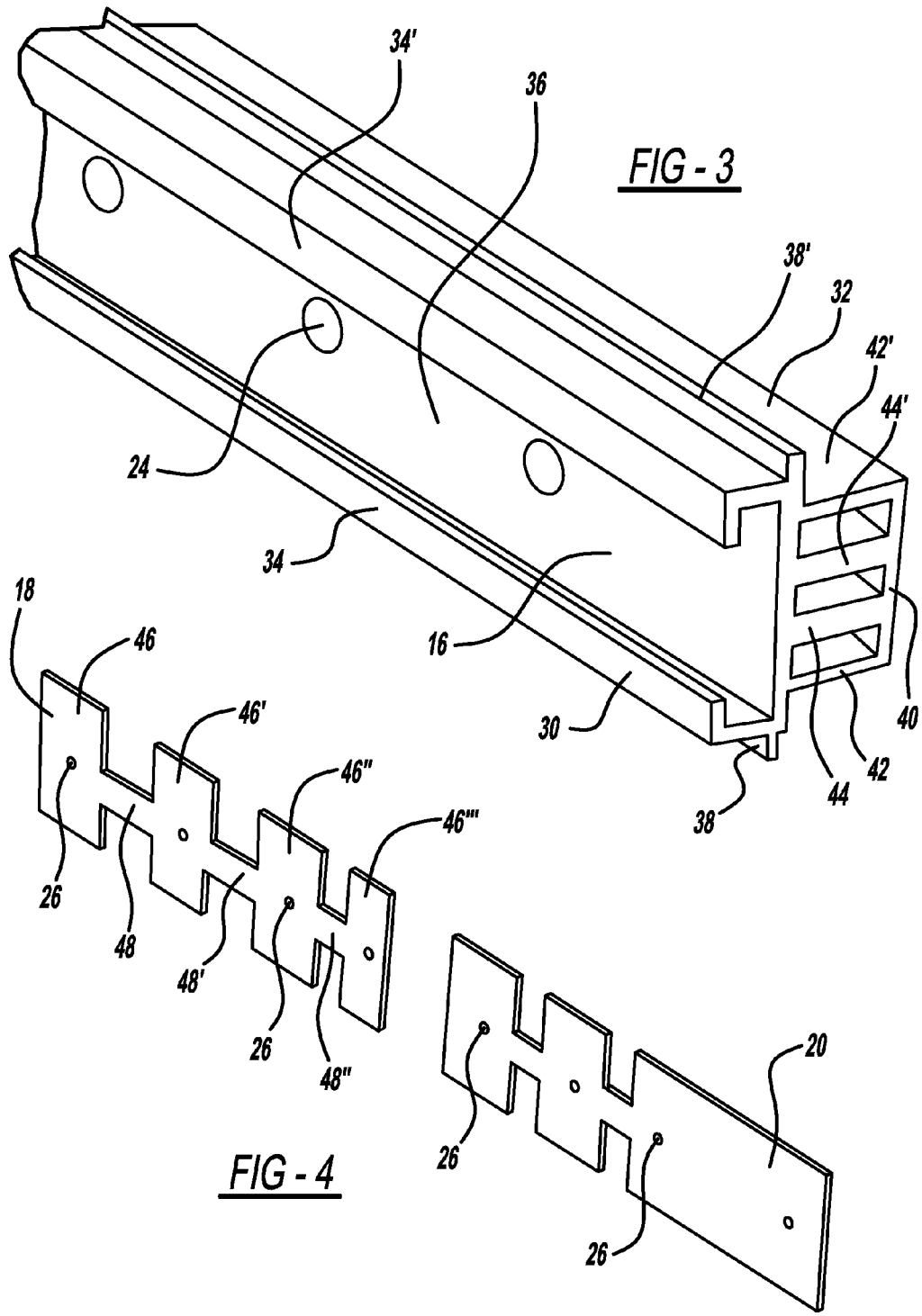

CARGO MANAGEMENT SYSTEM FOR VEHICLE

TECHNICAL FIELD

The disclosed invention relates generally to cargo systems for vehicles. More particularly, the disclosed invention relates to a cargo management system for a vehicle including tie down elements and reinforcing back plates suitable for attachment to an existing cargo area.

BACKGROUND OF THE INVENTION

Cargo box inners or cargo boxes typically define an open-topped bed for use in hauling cargo of different dimensions behind the passenger cabin of a truck. Cargo boxes have thus also become known as pickup boxes, truck boxes, pickup truck boxes, and truck bed boxes.

A challenge to the maximum use of the cargo box is the tendency of stored cargo to shift during transportation. In response to this operators often use rope and tie-downs to prevent the movement of the cargo. The tie-downs are traditionally anchored at various places inside of the cargo box.

Often an after-market component, known tie-downs suffer from a number of difficulties. One such difficulty is the attachment of the tie-down to the pickup box. Since the tie-down only functions correctly if rigidly attached, they are often attached by welding, a method that is inconvenient for most installers. Another difficulty is the inflexibility of the tie-downs once attached. Not all cargo requires the same tie-down location and, as a result, operators are often frustrated by the fixed arrangement of known tie-downs.

In an effort to overcome the challenges of known tie-down arrangements rail systems have been attached to the inner walls of cargo boxes. An attachment cleat is fitted to the rail which can be positioned and re-positioned at different points on the rail. While overcoming the problems associated with fixed-position tie-down arrangements the known rail systems use a rail and mechanical fasteners for mechanically attaching the rail to the wall of the pickup box. These systems use multiple spacers for attachment to the rail back and a like multiple number of reinforcing plates to which the spacers are anchored. Nuts are used behind the reinforcing plates to which bolt fasteners are attached. Because of the great number of parts used and because of the limited operating space (usually less than 50 mm) and the lack of visibility created thereby, this arrangement also requires the removal of entire panels for installation, creating challenges for the installer.

To avoid the step of panel removal some of the rail systems provide rails that can be welded to the inner wall of the cargo box. While providing an alternative to the mechanical fastening system, its plurality of spacers and reinforcing plates, and the step of removing a panel for attachment access, welding requires the installer to have specialized equipment which is not always available.

It would therefore be desirable to provide a cargo box tie-down system that provides a rail for selectively positionable cleats that can be easily attached to the wall of the cargo box without the need for extensive panel removal while avoiding the requirement for welding.

SUMMARY OF THE INVENTION

The disclosed invention provides an alternative arrangement to known cargo tie-down systems by providing a cargo management system for a vehicle having a cargo area such as a pickup bed, often with a bedliner. The arrangement of the disclosed invention includes a rail attachable to the interior surface of the cargo box inner panel, at least one reinforcement plate positionable against the outer surface of the inner panel, and a plurality of fasteners for holding the rail to the inner panel backed by the reinforcement plate. At least one cleat is fitted to the rail. The cleat can be moved and selectively positioned on the rail.

The rail has a rail portion and a body portion. The body portion is positioned through a slot formed in the bedliner and replaces the plural spacers of known technology. The body portion of the rail includes a base and a pair of opposed side walls connecting the base with the rail portion. This construction defines a hollow interior and enhances structural integrity without adding weight. To provide for additional strength to the rail the body portion preferably includes at least one interior wall between the base wall of the body portion and the rail portion and more preferably includes two such interior walls.

One or more reinforcement plates are used. Regardless of the number used, each reinforcement plate has apertures to accommodate multiple mechanical fasteners, thus eliminating the multiple reinforcement plates of known technology. More particularly, each reinforcement plate includes a plurality of reinforcement segments and reinforcement segment bridges. Each reinforcement segment is attached to an adjacent reinforcement segment by a reinforcement segment bridge. The bridge is narrower than the adjacent reinforcement segments, thus minimizing space and also providing the reinforcement plate with some flexibility for shaping to the surface of the inner panel.

The cargo management system of the disclosed invention offers several advantages over known technology. It is relatively easy to install without welding. The disclosed cargo management system has fewer parts than known technology and particularly eliminates the plural spacers for the rail and the plural reinforcement plates, both typically being provided with one spacer and one reinforcement plate per mechanical fastener. Because of the design of the elongated reinforcement plate of the disclosed invention the outer panel of the pickup bed does not have to be removed on installation.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 1 is a perspective view of a vehicle cargo area showing the cargo management system of the disclosed invention in place thereon;

FIG. 2 is a perspective view of the cargo management system of the disclosed invention;

FIG. 3 is a perspective view showing a portion of the rail of the cargo management system of the disclosed invention;

FIG. 4 is a perspective view of the back reinforcements of the cargo management system of the disclosed invention;

DETAILED DESCRIPTION OF THE PREFERRED EMBODIMENT

Figure 5:
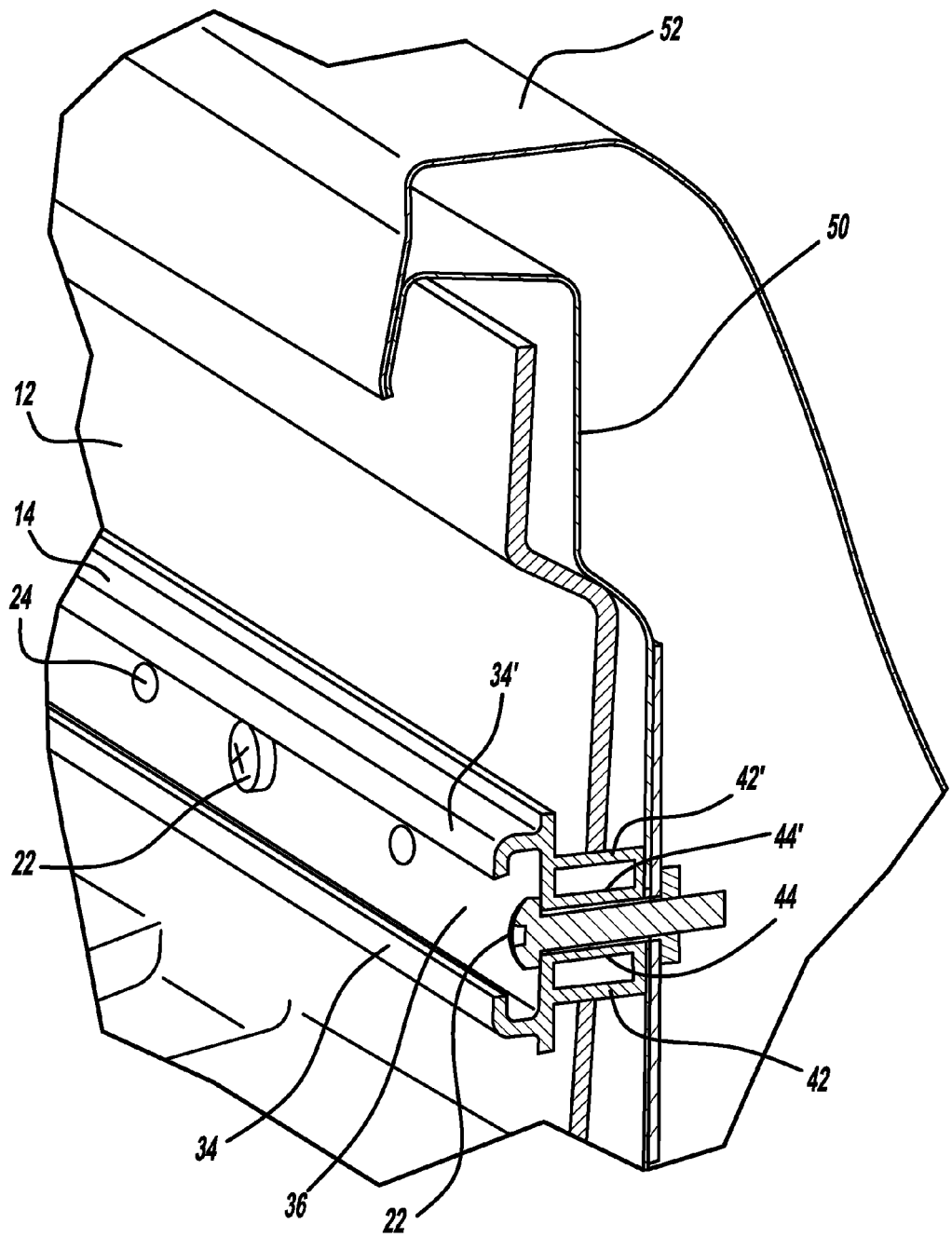
FIG. 5 is a perspective view of a portion of the cargo management system of the disclosed invention and a portion of the supporting wall of the cargo area of the vehicle, both shown in section.

In the accompanying figures, the same reference numerals will be used to refer to the same components. In the following description, various operating parameters and components are described for different constructed embodiments. These specific parameters and components are included as examples and are not meant to be limiting.

With reference to FIG. 1, a perspective view of a pickup box, generally illustrated as 10, is shown. The pickup box 10 includes a conventional bedliner 12. A cargo management system assembly 14 according to the disclosed invention is illustrated.

The pickup box 10 and the bedliner 12 as shown are for illustrative purposes only. It is to be understood that a great variety of shapes and sizes of both the pickup box 10 and the bedliner 12 are possible beyond those shown in FIG. 1. The cargo management system assembly 14 of the disclosed invention is highly adaptable for attachment to virtually any style or configuration of pickup box and bedliner. It may also be used in a pickup box without a bedliner. The cargo management system assembly 14 of the disclosed invention may also be adapted for use in other cargo-hauling areas in vehicles, such as inside SUVs or in passenger vehicles. The cargo management system assembly 14 may also find utility in other cargo-hauling forms of transport, including ships, trains and planes.

The cargo management system assembly 14 of the disclosed invention is illustrated in isolation in FIG. 2 where the assembly 14 is illustrated in perspective view. The cargo management system assembly 14 includes a rail 16 and adjacent reinforcement plates 18 and 20. The rail 16 is preferably composed of aluminum and is preferably formed from an extrusion process. The reinforcement plates 18 and 20 are preferably composed of steel and are preferably formed from a stamping process. However, other materials and methods of production of both the rail 16 and the reinforcement plates 18 and 20 may be employed.

A portion of the rail 16 is itself shown in isolation and in perspective view in FIG. 3. The reinforcement plates 18 and 20 are themselves shown in isolation and in perspective view in FIG. 4.

A plurality of mechanical fasteners 22 (shown in FIG. 2) are provided for secure attachment of the rail 16 and the reinforcement plates 18 and 20. The fasteners 22 may be of any known nut-and-bolt type of fasteners. The bolt portions of the fasteners 22 are selectively fitted through any of several apertures 24 formed through the rail 16 and through any of several apertures 26 formed in the reinforcement plates 18 and 20.

Two or more cleats 28 and 28', shown in FIG. 2, are movably attached to the rail 16. The cleats 28 and 28' may be moved to any location on the rail 16 and locked thereto as is known in the art. The cleats 28 and 28' shown in FIG. 2 are for illustrative purposes and are not intended as being limiting as any one of a great variety of cleats may be used with the disclosed invention.

Figure 6:
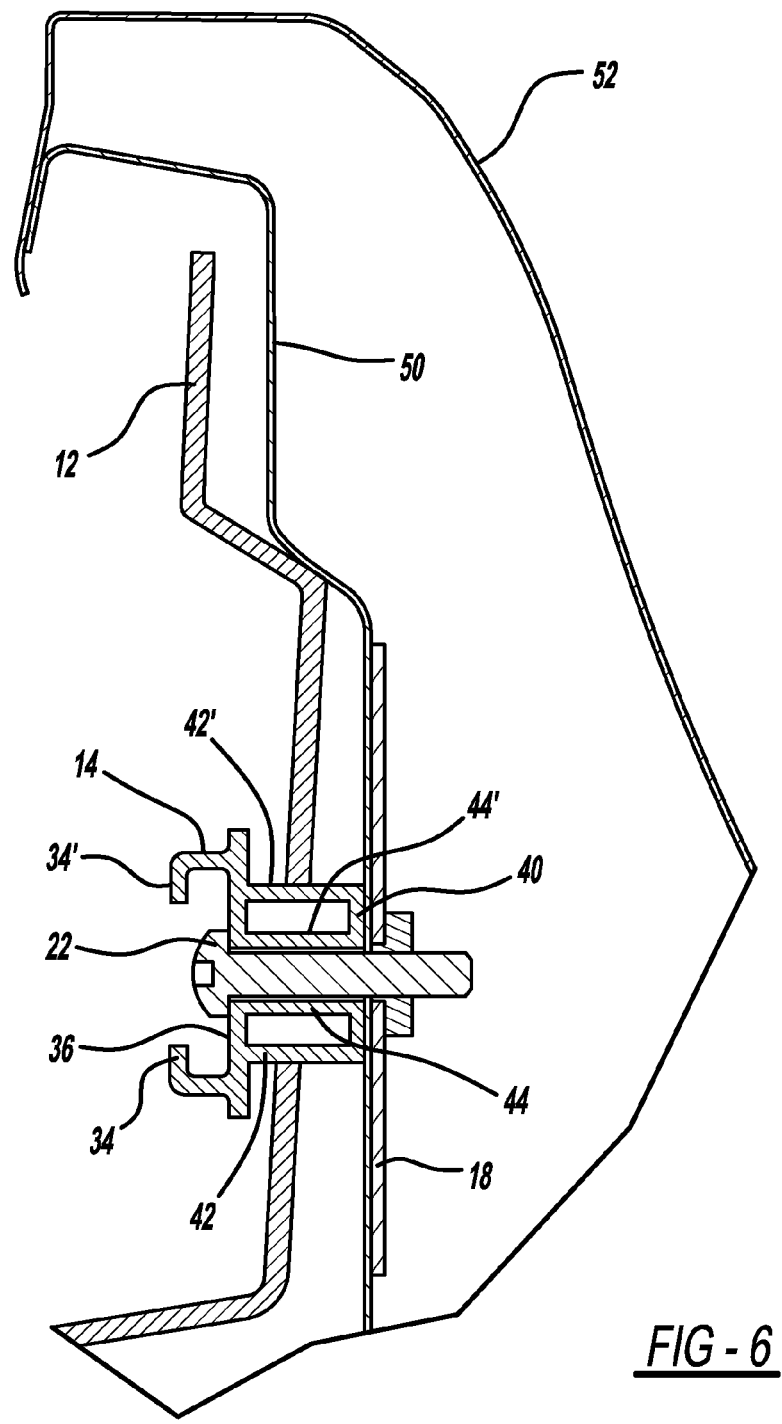
FIG. 6 is a sectional view of the cargo management system of the disclosed invention and a portion of the supporting wall of the cargo area of the vehicle.

The rail 16 has a rail portion 30 and a body portion 32. The body portion 32 is positioned through an elongated slot formed in the bedliner 12. This arrangement is illustrated in FIGS. 5 and 6 and will be discussed below in conjunction therewith.

The rail portion 30 of the rail 16 includes a pair of spaced apart and opposed cleat-retaining edges 34 and 34' which define a base channel 36 therebetween. A pair of opposed flanges 38 and 38' extend outwardly from the rail portion 30.

The body portion 32 of the rail 16 replaces the plural spacers used in known technology. The body portion 32 includes a base 40 and a pair of opposed side walls 42 and 42' connecting the base 40 with the rail portion 30. Additional spaced apart interior walls 44 and 44' also connect the base 40 with the rail portion 30. The bolt portion of the fastener 24 passes between the spaced apart interior walls 44 and 44'. The array of side walls 42 and 42' and interior walls 44 and 44' provide for a very lightweight yet very strong construction.

The reinforcement plates 18 and 20 are illustrated in isolation in perspective view in FIG. 4. With reference thereto, the reinforcement plates 18 and 20 are shown in a suggested configuration. Common to each configuration are reinforcement segments and reinforcement segment bridges. Using the reinforcement plate 18 as an example, the reinforcement plate 18 includes reinforcement segments 46, 46', 46" and 46'" with each of these segments having the bolt-passing aperture 26 formed therein. The width of each of the reinforcement segments 46, 46', 46" and 46'" may be varied with the objective being that the segments need to be wide enough to provide proper lateral support against the relevant panel.

Between the reinforcement segments 46 and 46' is a bridge 48, between the reinforcement segments 46' and 46" is a bridge 48', and between the reinforcement segments 46" and 46'" is a bridge 48". The bridges 48, 48' and 48" in conjunction with the reinforcement segments 46, 46', 46" and 46'", provide a one-piece reinforcement plate 18. This arrangement allows for easy assembly as will be discussed below. A greater or lesser number of reinforcement segments and bridges may be used without deviating from the spirit or scope of the disclosed invention.

FIGS. 5 and 6 illustrate the cargo management system assembly 14 in position on a pickup box. FIG. 5 is a partial perspective view while FIG. 6 is a sectional view. With reference to both of these figures, the cargo management assembly 14 is shown attached to a pickup box inner panel 50. The inner panel 50 is attached to a fender 52. The inner panel 50 and the fender 52 shown in FIGS. 5 and 6 are provided for illustrative purposes only and are not intended as being limiting as other inner panel and fender configurations may be present in other pickup box designs. The cargo management system assembly 14 of the disclosed invention is highly adaptable for fixation to a broad variety of cargo area surfaces.

As illustrated in FIGS. 5 and 6, the bolt portion of a fastener 22 is fitted through the rail 16 approximately between the two interior walls 44 and 44'. The body portion 32 of the rail 16 extends through an opening or slot formed in the bed liner 12 such that the base 40 abuts the inner surface of the inner panel 50. The reinforcement plate 18 (or 20) is positioned against the outer surface of the inner panel 50. The fasteners 22 hold the cargo management system assembly 14 together against and in relation to the inner panel 50.

The cargo management system of the disclosed invention has many advantages over known technology. One of these advantages is ease of assembly whereby only a few steps are required. These steps are as follows although variation of some of the steps is possible.

Step 1—Locate the position of the rail 16 on the bedliner 12 (if present) by attaching location paper to the selected location on the surface of the bedliner 12.

Step 2—Drill pilot holes through the bedliner 12 and the inner panel 50.

Step 3—Remove the bedliner 12.
Step 4—Cut out the slot defined by the location paper.
Step 5—Drill a pilot hole through the inner panel 50.
Step 6—Place a multi-stepped locator pin known in the art (not shown) through the rail 16 and through the pilot hole drilled in Step 5.
Step 7—Mark other fastener locations on the surface of the inner panel 50 through the apertures 24 using a marking pin.
Step 8—Drill holes into the inner panel 50 according to the marks made in Step 7.
Step 9—Return the bedliner 12 to the pickup box 10.
Step 10—Remove the vehicle wheel, wheel arcliner and mud guard (not shown).
Step 11—Without removing the fender 52, insert one of the reinforcement plates 18 or 20 between the fender 52 and the inner panel 50.
Step 12—Fit the reinforcement plate 18 (or 20) to the multi-stepped locator pin.
Step 13—Install the bolt portions of the fasteners 22 through the apertures 24 on the rail 16 through the open apertures 24.
Step 14—Remove the multi-stepped locator pin and insert the last fastener 22.

The above procedures may be varied in any of several ways and are intended as providing general but not exhaustive assembly and attachment guidelines. Regardless, it is apparent from these few steps that the cargo management system of the disclosed invention can be installed with a minimum of difficulty and with little training.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A cargo management system for use with a vehicle having a cargo area, the cargo area having a slotted bedliner and a wall, the wall having an inner side and an outer side, the system comprising:
    a rail positionable on the outer side of the wall, said rail having a rail portion and a body portion, said body portion being positioned through a slot in the bedliner;
    a cleat attachable to said rail; and
    a reinforcement plate positionable on the inner side of the wall.

2. The cargo management system of claim 1 further including a plurality of mechanical fasteners, said plate including a plurality of apertures formed therein for receiving said plurality of mechanical fasteners.

3. The cargo management system of claim 2 wherein said plurality of mechanical fasteners connect said rail to said reinforcement plate.

4. The cargo management system of claim 1 wherein said reinforcement plate includes a plurality of reinforcement segments and reinforcement segment bridges, each reinforcement segment being attached to an adjacent reinforcement segment by a reinforcement segment bridge.

5. The cargo management system of claim 4 wherein each of said reinforcement segments has a width and wherein each of said reinforcement segment bridges has a width, the width of at least some of said reinforcement segments being greater than the width of at least some of said reinforcement segment bridges.

6. The cargo management system of claim 1 wherein said rail portion has a width and a length and said body portion has a width of said rail portion being greater than said width of said body portion.

7. The cargo management system of claim 1 wherein said rail portion has a thickness and said body portion has a thickness, said thickness of said body portion being greater than said thickness of said rail portion.

8. The cargo management system of claim 1 wherein said body portion includes a pair of opposed sides connected to said rail portion, a base connected to said pair of opposed sides, and an interior wall connecting said base and said rail portion.

9. The cargo management system of claim 8 wherein said interior wall defines a first interior wall and wherein said rail portion further including a second interior wall spaced apart from and parallel with said first interior wall.

10. A cargo management system rail assembly for use with a vehicle having a cargo area, the cargo area having a wall, the wall having an inner side and an outer side, the system comprising:
    a rail positionable on the outer side of the wall;
    a cleat attachable to said rail;
    a reinforcement plate positionable on the inner side of the wall; and
    a plurality of mechanical fasteners, said plate including a plurality of apertures formed therein for receiving said plurality of mechanical fasteners.

11. The cargo management system rail assembly of claim 10 wherein said reinforcement plate includes a plurality of reinforcement segments and reinforcement segment bridges, each reinforcement segment being attached to an adjacent reinforcement segment by a reinforcement segment bridge.

12. The cargo management system rail assembly of claim 11 wherein each of said reinforcement segments has a width and wherein each of said reinforcement segment bridges has a width, the width of at least some of said reinforcement segments being greater than the width of at least some of said reinforcement segment bridges.

13. The cargo management system rail assembly of claim 10 wherein said plurality of mechanical fasteners connect said rail to said reinforcement plate.

14. The cargo management system rail assembly of claim 10 wherein said rail includes a rail portion and a body portion, said rail portion having a width and a length and said body portion having a width of said rail portion being greater than said width of said body portion.

15. The cargo management system rail assembly of claim 10 wherein said rail includes a rail portion and a body portion, said rail portion having a thickness and said body portion having a thickness, said thickness of said body portion being greater than said thickness of said rail portion.

16. The cargo management system rail assembly of claim 10 wherein said rail includes a rail portion and a body portion and wherein said body portion includes a pair of opposed sides connected to said rail portion, a base connected to said pair of opposed sides, and an interior wall connecting said base and said rail portion.

17. The cargo management system rail assembly of claim 16 wherein said interior wall defines a first interior wall and wherein said rail portion further including a second interior wall spaced apart from and parallel with said first interior wall.

18. A cargo management system rail assembly for use with a vehicle having a cargo area, the cargo area having a wall, the wall having an inner side and an outer side, the system comprising:

a rail positionable on the outer side of the wall, said rail including a rail portion and a body portion, said rail portion having a width and a length and said body portion having a width of said rail portion being greater than said width of said body portion;

a cleat attachable to said rail; and;

a reinforcement plate positionable on the inner side of the wall.

19. The cargo management system rail assembly of claim 18 wherein said reinforcement plate includes a plurality of reinforcement segments and reinforcement segment bridges, each reinforcement segment being attached to an adjacent reinforcement segment by a reinforcement segment bridge.

20. The cargo management system rail assembly of claim 19 wherein each of said reinforcement segments has a width and wherein each of said reinforcement segment bridges has a width, the width of at least some of said reinforcement segments being greater than the width of at least some of said reinforcement segment bridges.

* * * * *